United States Patent
Pardo

(10) Patent No.: US 8,832,962 B2
(45) Date of Patent: Sep. 16, 2014

(54) METHOD AND FACILITY FOR DRYING SLURRY-LIKE MATERIALS, IN PARTICULAR SLUDGE FROM WASTEWATER TREATMENT PLANTS

(75) Inventor: Pierre Emmanuel Pardo, Orsay (FR)

(73) Assignee: Degremont (FR)

( * ) Notice: Subject to any disclaimer, the term of this patent is extended or adjusted under 35 U.S.C. 154(b) by 294 days.

(21) Appl. No.: 13/511,045

(22) PCT Filed: Nov. 19, 2010

(86) PCT No.: PCT/IB2010/055304
§ 371 (c)(1),
(2), (4) Date: Aug. 14, 2012

(87) PCT Pub. No.: WO2011/061715
PCT Pub. Date: May 26, 2011

(65) Prior Publication Data
US 2012/0304488 A1 Dec. 6, 2012

(30) Foreign Application Priority Data
Nov. 23, 2009 (FR) ...................................... 09 05607

(51) Int. Cl.
*F26B 3/02* (2006.01)
*F26B 23/00* (2006.01)
*F26B 25/22* (2006.01)

(52) U.S. Cl.
CPC ............. *F26B 25/22* (2013.01); *F26B 2200/18* (2013.01); *F26B 23/002* (2013.01)
USPC .................... 34/304; 34/330; 34/334; 34/343; 34/349; 34/359; 95/53; 95/66; 210/774; 110/224; 165/104.16

(58) Field of Classification Search
USPC ........... 34/304, 305, 330, 343, 349, 359, 280, 34/381, 514; 95/53, 66; 210/177, 774; 110/222, 224
See application file for complete search history.

(56) References Cited

U.S. PATENT DOCUMENTS 5,323,546 A    6/1994  Glover et al.
5,373,648 A *  12/1994 Wolf .............................. 34/578
(Continued)

FOREIGN PATENT DOCUMENTS

DE    4138865 A1   5/1993
DE    4205619 A1   8/1993
EP    0781741 A1   7/1997

*Primary Examiner* — Steve M Gravini
(74) *Attorney, Agent, or Firm* — The Belles Group, P.C.

(57) ABSTRACT

The invention relates to a method for drying slurry-like materials, in particular sludge from wastewater treatment plants, including two drying stages, namely: a first indirect drying stage (2), supplied with hot fluid, which receives sludge having an entry dryness Se, and outputs sludge having an intermediate dryness Si and water steam, which is channelled towards a condenser (8) in which a heating fluid, in particular water, is reheated and, in turn, heats a heating gas for a second drying stage (6); and a step (5) of forming strings of sludge at the exit from the first stage; the second stage (6) of drying the strings of sludge using gas at least partially heated by the heat extracted from the condenser, said second stage outputting a slurry having a final dryness Sf; the intermediate dryness Si is controlled according to the measured entry dryness Se and the desired exit dryness Sf, for minimum consumption of the total energy used for drying, the flow rate, pressure and/or temperature of the hot fluid (3) supplying the first drying stage (2) being adjusted accordingly.

20 Claims, 2 Drawing Sheets

(56) References Cited

U.S. PATENT DOCUMENTS

| | | | |
|---|---|---|---|
| 6,101,739 A * | 8/2000 | Rutz et al. | 34/373 |
| 6,470,595 B1 * | 10/2002 | Gaiser et al. | 34/359 |
| 7,895,769 B2 * | 3/2011 | Jochem et al. | 34/385 |
| 2012/0304488 A1 * | 12/2012 | Pardo | 34/514 |
| 2013/0313206 A1 * | 11/2013 | Weisselberg | 210/774 |
| 2013/0333597 A1 * | 12/2013 | Pardo et al. | 110/342 |

* cited by examiner

METHOD AND FACILITY FOR DRYING SLURRY-LIKE MATERIALS, IN PARTICULAR SLUDGE FROM WASTEWATER TREATMENT PLANTS

PRIORITY

Priority is claimed as a national stage application, under 35 U.S.C. §371, to PCT/IB2010/055304, filed Nov. 19, 2010, which claims priority to French application Ser. No. 09/05607, filed Nov. 23, 2009. The disclosures of the aforementioned priority applications are incorporated herein by reference in their entirety.

The present invention relates to a method for thermal drying of slurry-like materials, in particular of sludge obtained notably from wastewater treatment plants, with a very low consumption of thermal energy.

The present invention can be used for drying of any slurry system to be dried, and which, in a pre-dried form, can be put into the form of spaghetti-like strings.

The technique for thermal drying of sludge obtained from urban wastewater treatment plants is well known: different technologies exist which make it possible to obtain a finished product, the final dryness of which is 85% or more.

The main objection to thermal drying is that of the excessively high energy use which is necessary for this drying, and therefore of the resulting operating costs.

This is why, in certain belt drying methods, the thermal drying in order to dry the sludge can recuperate calories at a low temperature (50-90° C.), which is dead heat and is therefore not used by another process (co-generation, turbine condensation, heat pump, thermal solar system, biogas boiler, etc.). However, this dead heat is in general not sufficient to dry the sludge completely. This leads to substantial energy consumption.

In addition, these low-temperature belt drying technologies cannot be used to dry sludge which is not sufficiently dehydrated upstream, since it is not possible to spread a mat of spaghetti satisfactorily over the dryer.

In other methods, the thermal drying recuperates the heat from the drying process itself, but this looping is not optimized from the point of view of energy.

The dryers which exist at present have energy necessary for drying the sludge of approximately 900-1100 kWh/TEE (Tonne of Evaporated Water). These dryers can be direct dryers, according to which the hot drying fluid, which in general is a gas, is directly in contact with the sludge to be dried, or indirect, according to which the hot gas or liquid drying fluid transmits its heat to the sludge through a wall.

The dryness of a sludge can be defined as the ratio of the mass of dry substances (MS) to the total mass of the sludge (MS+water) i.e. MS/(MS+$H_2O$).

Patent EP 0 781 741 B1 discloses a method for drying slurry-like products, in particular sludge from wastewater treatment plants, of the type comprising:
  a first drying stage (indirect drying) which receives sludge with an entry dryness Se, and outputs sludge with an intermediate dryness Si;
  a step of forming strings of sludge at the exit from the first stage; and
  a second stage of direct drying of the strings of sludge by means of a hot gas which outputs a product which has a final dryness Sf.

Drying methods of this type and dryer systems with pre-evaporation of the sludge can obtain energy consumptions of 700-800 kWh/TEE. This energy consumption is optimized in comparison with the dryers initially referred to, since re-use of part of the energy used in the first stage is injected into the second stage for drying of the latter. However, according to patent EP 0781 741 B1, in view of the conditions of dryness at the pre-evaporation output (40-60%) and the conditions of the temperature used in the dryer (120° C.), the energy loopings are not optimized.

The present invention proposes to provide an energy solution for drying of the sludge by optimizing the method and the regulation of the energy consumption, whilst adapting to non-constant use of external energy at a low temperature (50-90° C.).

The object of this invention is thus to provide a method for drying slurry-like products of the type previously defined, wherein the energy consumption is minimized.

The invention consists in controlling the pre-evaporation exit dryness, or intermediate dryness, such that the heat which is recuperated from the first evaporation stage is necessary and sufficient for the drying in the second stage.

According to the invention, a method for drying slurry-like materials, in particular sludge from wastewater treatment plants, comprising two drying stages, namely:
  a first drying stage of an indirect type, supplied with hot fluid, which receives sludge having an entry dryness Se, and outputs sludge having an intermediate dryness Si and water vapor, which is channeled toward a condenser (8) in order to reheat there a loop for heating fluid, in particular water;
  a step of forming strings of sludge at the exit from the first stage; and
  the second stage of drying the strings of sludge heated directly by a gas, which itself is heated by the heating fluid loop, this second stage outputting a product having a final dryness Sf, is characterized in that the intermediate dryness Si is controlled according to the measured entry dryness Se and the desired exit dryness Sf, for minimum consumption of the total energy used for the drying, the flow rate, pressure and/or temperature of the hot fluid supplying the first drying stage being adjusted accordingly.

Preferably, the intermediate dryness Si is determined for a minimum total energy consumption, on the basis of measurement of the entry dryness Se, the exit dryness Sf desired, and parameters comprising a specific coefficient $\alpha$ of the condenser, a specific coefficient $\beta$ of the second drying stage, and if applicable free added heat $Q_0$. The intermediate dryness Si can be controlled such that the heat recuperated from the first stage by means of the condenser is necessary and sufficient for the drying in the second stage.

Advantageously, a heat loop at a low temperature is used, which in particular is between 30° C. and 90° C., for heating of the second stage, comprising a liquid, in particular water, which is circulated according to a closed circuit and passes through the condenser, in order to recuperate from there the heat of the condensed steam, and a liquid/gas heat exchanger in order to heat the gas of the second drying stage.

The low-temperature heat loop can comprise an exchanger between the liquid in the loop and a thermal fluid branch of the first drying stage. The low-temperature heat loop can also comprise a heat exchanger in order to heat the liquid in the loop by recuperation of dead or cheap low-temperature energy.

The invention also relates to a facility for implementation of the method previously defined, comprising:
  a first dryer supplied with hot fluid, which receives sludge having an entry dryness Se, and outputs sludge having an intermediate dryness Si and water vapor, which is channeled toward a condenser in order to reheat there a heating fluid for a second dryer;

a device for forming strings of sludge at the exit from the first dryer; and the second dryer for drying the strings of sludge by means of a gas, in particular air, which is heated at least partly by the heat extracted from the condenser by means of the heating fluid, this second dryer outputting a product having a final dryness Sf, which facility is characterized in that it comprises means for controlling the intermediate dryness Si according to the measured entry dryness Se and the desired exit dryness Sf, for minimum consumption of the total energy used for the drying, the flow rate, pressure and/or temperature of the hot fluid supplying the first drying stage being adjusted accordingly.

Preferably, the facility comprises a heat loop at a low temperature, which in particular is between 30° C. and 90° C., for heating of the second stage, comprising a liquid, in particular water, which is circulated according to a closed circuit and passes through the condenser, in order to recuperate from there the heat of the condensed steam, and a liquid/gas heat exchanger in order to heat the gas of the second drying stage.

Advantageously, the facility comprises an adjustable-speed fan, the aspiration of which is connected to the steam and gas output of the first dryer, and the backflow of which is connected to the condenser, the speed of the fan being commanded in order to maintain weak low pressure (of approximately a few mbars) and controlled in the first dryer.

The transfer of the sludge between the exit from the first dryer and the forming device (5) at the entry of the second dryer can be assured by a speed-regulated coreless screw which makes it possible to assure the gas tightness at the exit from the first dryer.

The low-temperature loop for circulation of liquid of the facility can comprise:
- a part with a low temperature of between 30 and 80° C., and preferably between 60 and 70° C., upstream of the condenser;
- a part with a medium temperature of between 40 and 90° C., and preferably between 70 and 80° C., at the exit from the condenser;
- an exchanger of heat between the liquid in the loop and a free source of energy, downstream or upstream of the condenser, for reheating of the liquid in the loop by a free or low-cost low-temperature source of energy, in particular the motor of a co-generation unit, a heat pump, a wood or biogas boiler, thermal solar systems, or another source of dead energy;
- at the exit from the exchanger of heat between the liquid in the loop and the free source of energy, an exchanger with a thermal fluid branch which makes it possible to finish reheating the liquid in the loop at a regulated temperature, for the second dryer, which is between 40 and 90° C., and preferably between 80 and 90° C.;
- an exchanger for heat between liquid and gas, and in particular water and air, which makes it possible for the liquid in the loop to heat the gas of the second dryer, which is put into motion in particular by a circulation fan;
- a pump for the circulation of the water in the loop.

Advantageously, the facility comprises regulation comprising a first regulation loop in order to assure direct regulation of the intermediate dryness Si at the exit from the first dryer, with a means for calculation and command, and in particular an automaton which establishes an intermediate dryness set point Sic on the basis of operating parameters.

The regulation can be designed to determine an intermediate dryness set point Sic according to the formula:

$$Sic = (\beta + \alpha^*556)/[(\beta - 89^*\alpha)/Sf + 645^*\alpha/Se + Q_0)]$$

wherein:
Se is the entry dryness measured (%)
Sf is the final predetermined dryness (%)
$\beta$ is a specific coefficient of the second drying stage (6), in kWh/TEE
$\alpha$ is a specific coefficient of the condenser (8) (without dimensions)
and $Q_0$ is free heat which may be added in kWh/TMS.

The automaton can control a valve to control the flow rate, pressure or temperature of the thermal fluid according to the intermediate dryness measured, this control being carried out by means of regulation of the pressure of the thermal fluid in the case of a steam thermal fluid, or by regulation of the flow rate or temperature (by mixing with a cold return of the thermal fluid) in the case of a thermal fluid of an organic fluid type.

The facility can comprise regulation consisting of a regulation loop which controls the quantity of the heat Q3 supplied in the exchanger between the thermal fluid and the liquid in the low-temperature loop.

The regulation loop which controls the quantity of heat Q3 supplied in the exchanger between the thermal fluid and the liquid in the low-temperature loop can constitute a second regulation loop. The regulation of the facility can be assured solely on the basis of this second loop, by shunting (or by-passing) the first regulation loop.

The exchanger of heat between the thermal fluid and the liquid in the low-temperature loop can have as a control set point the temperature of the liquid in the loop at the exit from the exchanger, this temperature permitting the efficient operation of the exchanger between the thermal fluid and the gas of the second dryer, and making it possible to ensure that the energy requirement of the second dryer is balanced.

The facility can comprise a regulation loop according to which the heat Q3 supplied to the exchanger is measured by means of measurement of the temperature and flow rate at the entry and exit of the exchanger, and, if the heat Q3 is greater than a specific set point which is close to zero but is not nil, in order always to have a regulation range, the regulation modifies the exit signal of the first regulation loop, such that the heat supplied to the first dryer is adapted.

In order to be in optimum conditions for the exchanger and the condenser, the regulation of the facility can comprise a third regulation loop which uses as a set point the temperature of the water loop at the exit from the exchanger. The third regulation loop is advantageously designed to use a set point temperature which is defined relative to a set point which depends on the flow rate of sludge measured at the sludge supply pump, and when the temperature at the exit from the exchanger between the liquid in the low-temperature loop and the gas of the second dryer increases, the flow rate of the circulation pump of the loop decreases to a range which is acceptable for the components.

According to the invention, a low-temperature heat loop is used for heating of the second stage. This loop makes it possible to recuperate dead or cheap low-temperature energy for the heating of the second dryer. The dryness at the exit from the first stage will be adapted according to the energy recuperated from this dead or cheap energy.

Dryer technologies also often comprise recirculation of the sludge in order either to avoid undergoing the plastic phase of the sludge (45 to 65% dryness) inside the dryer, or to prepare the sludge upstream so that it is compatible with the drying technology.

The invention does not use recirculation of the sludge, and thus makes it possible to obtain greater exploitability of the system.

Thus, the advantages provided by the method which is the subject of the invention in comparison with the existing techniques include:

Energy consumption which is lower than all the existing technologies, of 400 to 600 kWh/TEE instead of 1000 or 700-800 kWh/TEE A possibility of decreasing this consumption further by optimization of the energy loop on the basis of free dead, or cheap, low- or medium-temperature energy available Use with any type of sludge, by adapting the spaghetti formation technology, i.e. forming into strings, to the sludge concerned No use of a method for recirculation of the sludge.

In addition to the above-described provisions, the invention consists of a certain number of other provisions which will be explained explicitly hereinafter in relation to exemplary embodiments described with reference to the drawings which are appended but are in no way limiting. In these drawings.

Figure 1:
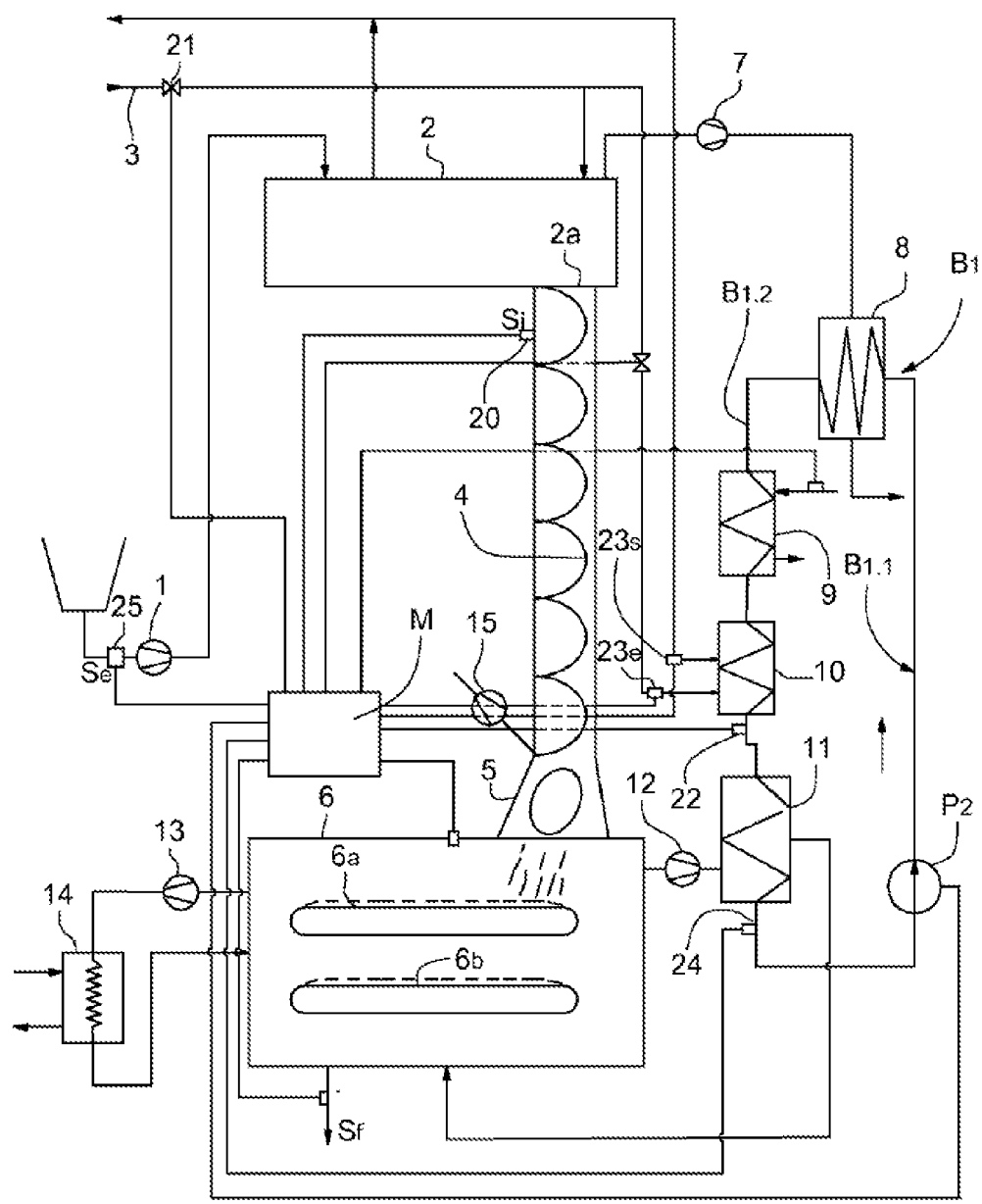
FIG. 1 is a diagram of a facility which implements the method according to the invention.

With reference to FIG. 1 of the drawings, it can be seen that a facility according to the invention comprises a supply of slurry-like sludge with dryness generally of between 16 and 30% assured by a pump 1. The sludge is admitted in a sealed manner in a first dryer 2 of an indirect type. This dryer can be for example of the thin layer type, or with disks or blades. However the dryer with disks will be preferred.

This indirect dryer 2 is heated by a thermal fluid circuit 3, the entry and exit temperatures, the flow rate and the pressure of which are controlled. In this process, the quantity of energy Q1 supplied to the dryer 2 is controlled. The thermal fluid 3 can for example be steam or an organic fluid, in particular oil, the temperature of which can be between 180° C. and 210° C. by way of non-limiting example.

The indirect dryer 2 is also equipped with means (not represented) for measurement of pressure, which are regularly distributed, and means (not represented) for measurement of the weight of the dryer. The air tightness of this dryer is produced such that air intake is minimal. Furthermore, for additional thermal optimization, this dryer can be suitably insulated.

At the exit from the indirect dryer 2 the sludge is conveyed by a screw 4 which is accommodated in a cylindrical tube, thus permitting a reduction of the air intake in the dryer at the exit from this dryer. The screw 4 is in particular constituted by an coreless screw. The temperature of the screw can be maintained by the water heating network.

At the exit from the screw, the sludge passes into a device 5 for formation into strings, which is also known as a spaghetti producer, and which, by plunging the sludge into calibrated holes, makes it possible to create a mat of spaghetti or strings on the belts 6a, 6b of a belt dryer 6.

The belt dryer 6 can have one or more stages, in order to optimize the specific consumption of this dryer.

A fan 7 makes it possible to control the pressure in the dryer 2 in order to maintain controlled weak low pressure. This point is essential since firstly the dryer 2 may not be subjected to excess pressure, in order to avoid any escape of odors but, in addition, the dryer 2 may not be subjected to excessively low pressure in order to prevent any intake of air into the fan extraction circuit 7, which would modify considerably the thermal balance of the assembly.

The air tightness of the dryer 2 is thus controlled by perfect air tightness not only at the entry, but also of the inspection flaps of the dryer. The air tightness of the exit of the dryer is assured at the same time by:

The exit of the sludge in the low part 2a of the dryer, which part is filled with sludge.

The presence of the speed-regulated coreless screw 4 in this low part. This screw 4 makes it possible to ensure that the quantity of sludge in the dryer is always sufficient to assure the air tightness. This screw is regulated by the weight of the dryer 2.

The subjection to low pressure of this screw 4 at the exit from the screw, at the spaghetti producer 5, by means of a dedicated fan 15.

Finally, the air tightness is assured by the controlled maintenance of the pressure in the dryer 2 by means of the fan 7. The fan 7, which is connected by a duct to the high end part of the dryer 2, aspirates the air, the water vapor and the non-condensables in order to convey them by means of a duct to a condenser 8. The flow rate of air at the fan 7 is controlled without allowing the vacuum (created by the condensation of the water vapor output from the dryer 2 and conveyed to the condenser 8) to give rise to aspiration in an uncontrolled manner in the dryer.

The vapors which are aspirated by the fan 7 contain water vapor and a quantity of non-condensables which depends on the quality of the sludge and the air tightness, but which in general is less than 10% by weight, with well-controlled air tightness. These non-condensables are obtained from the vaporization of part of the components of the sludge and a very low air intake.

These vapors then pass through the water condenser 8 in which there circulates the water of a low-temperature thermal loop B1, which forms the basis for the energy recuperation.

The low-temperature loop B1 is constituted by the following parts:

a part B1.1 with a low temperature of between 30 and 80° C., and preferably between 60 and 70° C., upstream of the condenser 8;

a part B1.2 with an average temperature of between 40 and 90° C., and preferably between 70 and 80° C., at the exit from the condenser 8;

at the exit from the condenser, the water can be further reheated in an exchanger 9 by a "free" low-temperature energy source, such as the motor of a co-generation unit, a heat pump, a biogas or wood boiler, thermal solar systems, or any other dead or cheap source of energy. It should be noted that according to the temperature areas concerned for this source of free heat, this source may be positioned upstream or downstream of the condenser 8;

At the exit from the exchanger 9, an exchanger 10 for the thermal fluid 3 which is conveyed by a branch of the fluid 3 supply duct, makes it possible to complete the reheating of the loop to a temperature which is regulated for the belt dryer 6, of between 40 and 90° C., and preferably between 80 and 90° C.;

This heated water then makes it possible to heat by means of a water-air exchanger 11 the air of the low-temperature dryer 6 which is put into motion by means of the circulation fan 12.

A pump P2, in particular at the exit from the exchanger 11, for the circulation of the water in the loop B1.

The aspiration of the fan 12 is connected by means of a duct to the inner volume of the dryer 6, and the backflow is connected by a duct to the entry of the exchanger 11 for the gas to be heated. The exit from the exchanger 11 for the reheated gas is connected to the inner volume of the dryer 6.

A circulation fan 13, the aspiration of which is connected by a duct to the inner volume of the belt dryer 6, and the backflow of which is connected by a duct to the entry of a water condenser 14, makes it possible to eliminate by means of this condenser 14 the humidity which is contained in the dryer 6. The air which is output from the condenser 14 is returned by a duct to the belt dryer 6.

Figure 2:
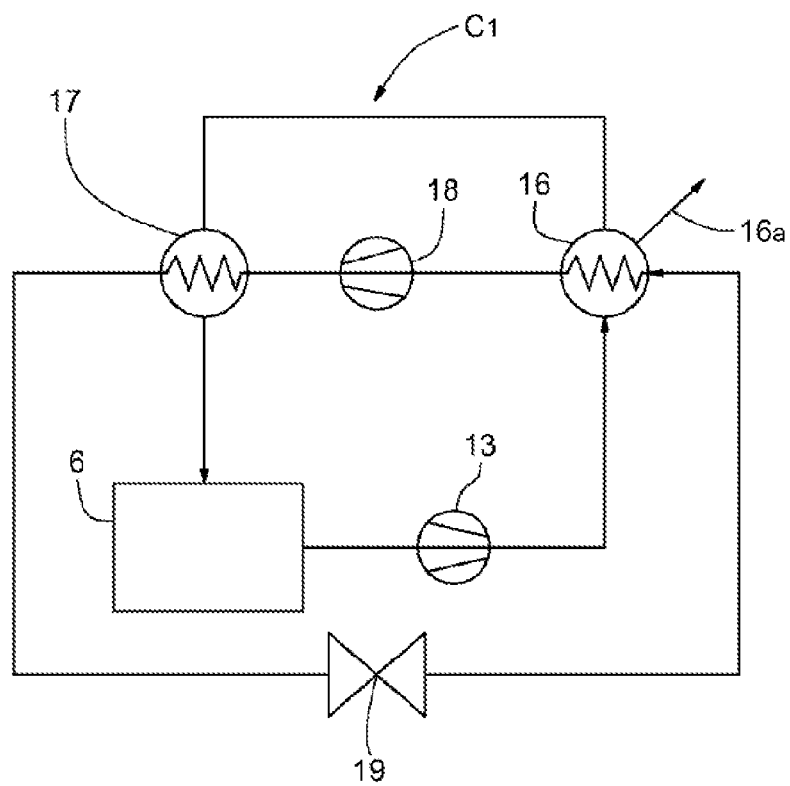
FIG. 2 is a diagram of a complementary device for the facility.

Another source of "free" heat which is assimilable to Q0 can be constituted by a heat pump C1 on a part of the circulation fan circuit 13 (see FIG. 2). The heat pump C1 comprises a circuit for a specific fluid which, when it reaches the liquid state in an evaporator 16, is vaporized by absorption of the heat, then compressed in a compressor 18, returned to the liquid state in a condenser 17 by giving up heat, then expanded in a pressure-reducing valve 19 before being returned to the evaporator 16. The hot, humid air which is output from the dryer 6 passes through the heat exchanger which is constituted by the evaporator 16. The water vapor from the hot air is condensed by means of the evaporator 16, which recuperates the condensation energy. The condensation water is discharged via a duct 16a. The cold air which is output from the evaporator 16, freed from the condensed water vapor, is then reheated in the heat exchanger of the condenser 17, and is re-injected into the dryer. The energy which is re-injected into the condenser 17 is assimilable to Q0, and must therefore be taken into account in the global system for operation of the facility.

EXAMPLES OF OPERATION

Case without Free Energy

This is the case when no free energy, or dead heat, is supplied to the exchanger 9. $Q_0$ is then zero.

A sludge pumped by the pump 1 has the following characteristics:

Dryness 20%, level of MV (MV=volatile substances): 60%, temperature 12° C., flow rate 6245 kg/h (kg/hour).

The energy power to dry this sludge in the first dryer 2 to a dryness of 36.5% requires 2495 kW from the thermal fluid 3, and the flow rate of vapor through the fan 7 is 3195 kg/h, including 290 kg/h of non-condensables. The temperature of these vapors is 100° C.

At the exit from the condenser 8, the non-condensables and the vapors have a temperature of 80° C., the remaining quantity of water vapor is 164 kg/h, and the power exchanged is 1575 kW.

On the water loop side B1, at the entry B.1.1 of the water loop before the condenser 8, the temperature is 72° C., at the exit from the condenser 8 the temperature of the water loop is 86° C., and the flow rate is 96.8 tonnes/h.

It is considered that no heat is provided by the exchanger 9. The water in the loop is then heated to 88.74° C. in the exchanger 10. The energy consumption is 318 kW.

The heat which is supplied to the air circuit of the fan 12 makes it possible to decrease the temperature of the water in the loop to 72° C., whilst providing the air circuit with a power of 1826 kW. This calorific power makes it possible to evaporate the water in the belt dryer 6 to a dryness of 90% with a ratio of 872 kWh/TEE.

The total power consumed by the system is 2495+318=2813 kW for a quantity of evaporated water of 4997 kg/h. The specific consumption is therefore 563 kWh/TEE.

Case with Free Energy

This is the case when free energy, or dead heat, is supplied to the exchanger 9. $Q_0$ is then positive.

Let us take the case of free energy, for example from a co-generation motor, which makes it possible to supply 1000 thermal kW by heating the water in the thermal loop to 80° C. in the exchanger 9.

For sludge pumped by the pump 1 with the following characteristics:

Dryness 20%, level of MV: 60%, temperature 12° C., flow rate 6245 kg/h, the energy power required to dry the sludge in the first stage or first dryer 2 to a dryness of 33% is 2184 kW.

The vapors aspirated by the fan 7 represent 2650 kg/h, of which 241 kg/h are non-condensables.

At the exit from the condenser 8, the vapors have a temperature of 78° C., and the power supplied to the water circuit B1 is 1353 kW, which represents a temperature increase of 70° C. to 78° C. of 145.4 tonnes/h.

The exchanger 9 of the co-generation motor makes it possible to heat the water from 78 to 83.9° C. The heat exchanger 10 for the fluid 3 makes it possible to reheat the water from 83.9° C. to 84.1° C. with consumption of 44 kW.

The power supplied to the air is 2329 kW, and makes it possible to dry the sludge to 90% dryness with a specific consumption of 900 kWh/TEE.

The consumption excluding free energy is then 2184+44=2228 kW for 4997 kg/h of evaporated water, i.e. a specific consumption of 445 kWh/TEE.

Other Applications

This low-temperature drying method and the corresponding facility can be applied to any type of slurry-like product, the preparation of which will have made it possible to remove the pebbles or an excessively large quantity of fibers and tow which may impede the spaghetti production.

Biomass pulp products applicable can be wood, food processing products or animal transformation products.

Regulation

Consideration is now given to the regulation of the method and the thermal drying facility for sludge obtained in particular from wastewater treatment plants, in order to make it possible to obtain very low thermal energy consumption.

The regulation can be used for any method and drying facility of any system for slurry which is to be dried, and which can be put into the form of spaghetti in a pre-dried form.

Firstly there is definition from a theoretical point of view of the relationships between the various components of the facility.

Figure 3:
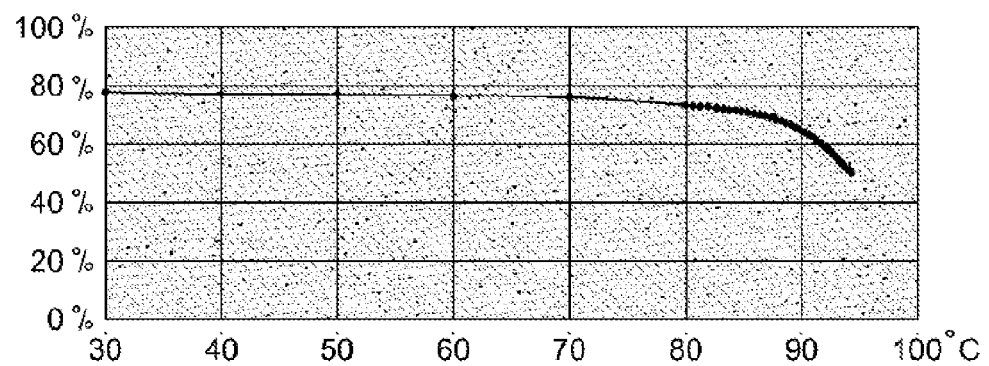
FIG. 3 is a diagram illustrating the variation of the ratio of heat recuperated to heat used in the first drying stage, expressed as a % and shown on the Y-axis, according to the temperature in ° C. of the non-condensables, at the exit from the first drying stage, which is shown on the X-axis.

With reference to FIG. 3, the reaction of the condenser 8 to a variation in the temperature of the water loop B1 is considered, and therefore its cooling capacity.

Taking into consideration 1000 kg/h of vapors output by the fan 7, and the fact that these vapors are input at 100° C. and consist of 10% non-condensables, the quantity of energy which is recuperated in the condenser 8, expressed as a % of the heat used in the dryer 2, according to the output temperature of the non-condensables, shown on the X-axis, is illustrated in FIG. 3.

If the level of non-condensables in the vapors obtained from the fan 7 is controlled, which is one of the principles of the invention, the quantity of energy depends very little on the output temperature level of the non-condensables, provided that this does not exceed 83° C.: output at 83° C.=70%; output at 70° C.=74%; output at 30° C.=78%.

In addition, since a vapor/water condenser is involved, the coefficients of exchange are very good, and the temperature of the vapors will depend above all on the intake temperature of the water circuit of the low-temperature loop B1.

In the temperature range envisaged, it can be considered that the output, expressed by a coefficient $\alpha$, is 72% ($\alpha$=72%=0.72) and is quite constant, even with a low variation of output temperature of the non-condensables.

The following part describes the mathematical bases of the regulation according to the present invention.

The following is applied:
Se: the entry dryness of the sludge at 1
Si: the intermediate dryness at the exit from the dryer 2 and the entry of the screw 4
Sf: the final dryness at the exit from the belt dryer 6.

1 tonne (1000 kg) of dry substance is taken into consideration at the entry of the pump 1. The quantity of water which is evaporated in the first stage 2 is: (1/Se-1/Si).

The quantity of heat Q1 which is necessary for this evaporation is:
- slightly dependent on the composition of the sludge. [MS (dry substances), MV (volatile substances)]
- averagely dependent on the entry dryness Se and on the entry temperature of the sludge, and
- highly dependent on the quantity of water to be evaporated, and therefore on the factor: (1/Se-1/Si).

In fact, in addition to the evaporation, the heating of the sludge must be carried out.

This quantity of heat Q1 can be expressed with relative accuracy by means of the theoretical formula:

$$Q1(Se,Si)=k(1/Se-1/Si)(1+0.16[Si(1-Se)/(Si-Se)]$$

Q1 in kWh
Se and Si in %
k being a constant equal to 556 with the above units.

In the theoretical formula the dependence on the composition of the sludge has been eliminated, since this comes only within the second order; this is why this formula is valid with accuracy to within approximately 5%.

The heat which is necessary for the second drying 6 is approximated as:

$$Q2(Sf,Si)=\beta*(1/Si-1/Sf)$$

Q2 in kWh
Si and Se in %
$\beta$ in kWh/TEE

The parameter $\beta$ corresponds to the specific heat of evaporation of the water in the second dryer 6, in kWh/TEE, depending on the belt drying technology selected, and into which the thermal losses of the heating loop have been integrated. Since the sludge is hot when it enters the belt dryer 6 stage, $\beta$ has an order of magnitude of [600-900] kWh/TEE.

The heat which can be recuperated from the condenser 8 is defined as
$\alpha$Q1, where $\alpha$=approximately 0.72 as previously described.

The free heat which is supplied to the exchanger 9 is equal to Q0.

The heat to be supplied by the thermal fluid 3 to the belt dryer 6 is equal to: Q3=Max(Q2−$\alpha$Q1−Q0; 0).

Q3 is the heat provided by the thermal fluid 3 via the exchanger 10.

The total heat provided is equal to Qg=Q1+Q3=Q1+Q2−$\alpha$Q1−Q0, as long as Q2−$\alpha$Q1−Q0>0 and then Q1, when Q2−$\alpha$Q1−Q0≤0.

This gives:
Qg(Si)=556(1−$\alpha$)*(1/Se−1/Si)  (1+0.16[Si(1−Se)/(Si—Se)]*1.03+850((1/Si−1/Sf))−Q0 as long as Q2−$\alpha$Q1−Q0>0 and Qg(Si)=556(1/Se−1/Si)(1+0.16[Si(1−Se)/(Si−Se)] subsequently.

The objective is to minimize this function of Si. This function is a decreasing function of Si, as long as Q2−$\alpha$Q1−Q0>0, then an increasing function of Si.

The minimum of this function is obtained when all of the heat of the first drying stage 2 is necessary and sufficient to heat the second stage 6. Thus, when Q2=$\alpha$Q1+Q0.

This function is resolved according to the equation [A] below.

$$Si=(\beta+\alpha*556)/[(\beta-89*\alpha)/Sf+645*\alpha/Se+Q0). \quad [A]$$

Thus, in the knowledge of:
$\beta$ which depends on the technology used for the belt dryer 6
$\alpha$ which is quite stable according to the exit temperature of the non-condensables
Sf which is fixed
Qo which is fixed and is reduced to the quantity of energy which can be supplied for 1 tonne of MS (dry substances),
it is possible to determine the optimum dryness Si as a function of Se.

Numerical Application:
$\beta$=850
$\alpha$=0.72
Sf=90%
Qo=0
Se=20%
Si=39.1%

Description of the Regulation

According to the invention, the minimization of the heat consumed within the context of drying in two stages is obtained by recuperation of high-temperature energy from the first stage 2 by condensation of the steam in order to heat a low-temperature thermal loop B1 (40-90° C.), which itself makes it possible to heat the second drying stage 6. The present invention additionally makes it possible to take into account in the regulation the installation of an exchanger 9 to recuperate the dead heat from another facility (heat Q0).

According to the invention, the intermediate dryness Si is controlled in accordance with the entry dryness measured Se and the desired exit dryness Sf.

The principle of the regulation of the facility and the method is thus, on the basis of the dryness measurement Se and the regulation parameters Sf, $\beta$, $\alpha$ and Qo, to establish an exit dryness set point Si. The intermediate dryness measurement Si is assured by a dryness sensor 20 at the exit from the dryer 2.

Other regulations complete and make certain the first regulation, which is assured by a first regulation loop.

The facility comprises a plurality of regulation loops:

The purpose of the first regulation loop is direct regulation of the intermediate dryness Si at the exit from the dryer 2. A calculation and control means, and in particular an automaton M, is provided in order to establish an intermediate dryness set point Sic, in particular on the basis of the formula [A] previously provided, and values of parameters and quantities supplied by different measurement sensors.

The automaton M controls a control valve 21 for the flow rate, the pressure or the temperature of the thermal fluid, according to the intermediate dryness Si measured by the sensor 20. This control can be carried out by regulation of the flow rate of the thermal fluid, in the case of a steam thermal fluid, or by regulation of the flow rate or the temperature (by mixing with the cold return of the thermal fluid), in the case of a thermal fluid of the organic fluid type.

Since the reaction times of the installation are long, the controls will be carried out in accordance with these reaction times.

A second regulation loop controls the quantity of heat Q3 supplied in the exchanger 10 by the thermal fluid 3 to the water of the low-temperature loop B1. In fact, it has previously been stated that the optimum energy is obtained when this quantity of heat Q3 is 0, without being negative.

The purpose of this exchanger 10 is to control the temperature of the water loop at the exit from the exchanger 10, measured by a sensor 22 which transmits the data to the automaton M. This temperature permits efficient operation of the exchanger 11, and makes it possible to assure that the energy requirement of the low-temperature dryer 6 is well balanced.

If the temperature at the exit from the exchanger 10 is not reached, it is because the heat which is taken from the exchanger 11 is greater than that supplied by the condenser 8, and therefore the optimum energy is no longer obtained.

The heat Q3 supplied to the exchanger 10 is therefore measured by means of measurement of the temperature and flow rate at the entry of the exchanger 10 by a set of sensors 23e, and at the exit from the exchanger 10 by a set of sensors 23s, the sensors being connected to the automaton M in order to transmit the values measured.

If the heat Q3 is greater than a specific set point which is close to 0 but not nil, in order always to have a regulation range, the second regulation loop modifies the output from the first regulation loop previously described, such that the heat supplied to the first dryer 2 is adapted.

It is also possible to regulate the facility and the system solely by means of the second regulation loop by shunting (by-passing) the first regulation loop.

Finally, in order to be in the optimum conditions for the exchanger 11 and the condenser 8, a third regulation loop uses as a set point the temperature of the water loop at the exit from the exchanger 11, measured by a sensor 24 which is connected to the automaton, in order to transmit the temperature value. This temperature is defined relative to a set point which depends on the flow rate of sludge measured at the pump 1.

If the temperature at the exit from the exchanger 11 increases, the flow rate of the circulation pump P2 of the loop decreases to a range which is acceptable for the equipment.

This triple loop is auto-stable. In fact, if the needs for heat in the belt dryer 6 decrease, the temperature at the exit from the exchanger 11 will increase, and the flow rate of the circulation pump will decrease in the exchangers 11 and 8. In the condenser 8, the temperature difference $\Delta T$ between the exit and entry of the condenser 8 for the water in the loop B1 will increase, and the temperature at the entry of the exchanger 10 will increase, which will decrease the amount of heat which needs to be supplied to the exchanger 10 by the thermal fluid 3, below the set point value.

In this case, the automaton M will send an order to the valve 21 of the dryer 2 to decrease the flow rate of thermal fluid 3 in the dryer 2, which will decrease the intermediate dryness Si and increase the need for evaporation on the belt conveyor, which will re-balance the temperature at the exit from the exchanger 11.

In addition, a temperature set point at the exit from the exchanger 11 will be defined relative to the flow rate of the pump 1 which is supplied to the automaton M by a sensor 25.

In fact, if the flow rate of the pump 1 decreases, with the intermediate dryness Si being regulated by the first regulation loop, the absolute quantity of heat in the second dryer 6 decreases. The exchange at the exchanger 11 will therefore also be decreased, and if the entry temperature is fixed, the exit temperature will increase. It is therefore necessary to decrease the flow rate set point so that the cooling is increased.

It will be appreciated that the present invention is not limited to the exemplary embodiments described and/or represented, but incorporates all the variants which come within the scope of the appended claims.

The invention claimed is:

1. A method for drying slurry-like materials, in particular of sludge from wastewater treatment plants, the method comprising:
drying in a first drying stage (2) of an indirect type, supplied with hot fluid, which receives sludge having an entry dryness Se, and outputs sludge having an intermediate dryness Si and water vapor, which is channeled toward a condenser (8) in order to reheat there a loop for heating fluid, in particular water;
forming strings of sludge at the exit from the first stage; and
drying in a second drying stage (6), in which the strings of sludge are heated directly by a gas, the gas being heated by the heating fluid loop, this second stage (6) outputting a product having a final dryness Sf,
wherein the intermediate dryness Si is controlled according to the measured entry dryness Se and the desired exit dryness Sf, for minimum consumption of the total energy used for the drying, the flow rate, pressure and/or temperature of the hot fluid (3) supplying the first drying stage (2) being adjusted accordingly.

2. The method as claimed in claim 1, wherein the intermediate dryness Si is determined for a minimum total energy consumption, on the basis of measurement of the entry dryness Se, the exit dryness Sf desired, and parameters comprising a specific coefficient $\alpha$ of the condenser (8), a specific coefficient $\beta$ of the second drying stage (6), and if applicable free added heat $Q_0$.

3. The method as claimed in claim 1, wherein the intermediate dryness Si is controlled such that the heat recuperated from the first stage by means of the condenser (8) is sufficient for the drying in the second stage (6).

4. The method as claimed in claim 1, wherein a heat loop (B1) at a low temperature is used, which in particular is between 30° C. and 90° C., for heating of the second stage (6), comprising a liquid, in particular water, which is circulated according to a closed circuit and passes through the condenser (8), in order to recuperate from there the heat of the condensed steam, and a liquid/gas heat exchanger (11) in order to heat the gas of the second drying stage (6).

5. The method as claimed in claim 4, wherein the low-temperature heat loop (B1) comprises an exchanger (10) between the liquid in the loop (B1) and a thermal fluid branch (3) of the first drying stage (2).

6. The method as claimed in claim 4, wherein the low-temperature heat loop (B1) comprises a heat exchanger (9) in order to heat the liquid in the loop by recuperation of dead or cheap low-temperature energy.

7. A facility for implementation of a method as claimed in claim 1, comprising:
a first dryer (2) supplied with hot fluid, which receives sludge having an entry dryness Se, and outputs sludge having an intermediate dryness Si and water vapor, which is channeled toward a condenser (8) in order to reheat there a heating fluid for a second dryer (6);

a device (5) for forming strings of sludge at the exit from the first dryer (2);

the second dryer (6) for drying the strings of sludge by means of a gas, in particular air, which is heated at least partly by the heat extracted from the condenser (8) by means of the heating fluid, this second dryer (6) outputting a product having a final dryness Sf; and means (M, 21) for controlling the intermediate dryness Si according to the measured entry dryness Se and the desired exit dryness Sf, for minimum consumption of the total energy used for the drying, the flow rate, pressure and/or temperature of the hot fluid (3) supplying the first drying stage (2) being adjusted accordingly.

8. The facility as claimed in claim 7, further comprising a heat loop (B1) at a low temperature, which in particular is between 30° C. and 90° C., for heating of the second stage (6), the heat loop comprising a liquid, in particular water, which is circulated according to a closed circuit and passes through the condenser (8), in order to recuperate from there the heat of the condensed steam, and a liquid/gas heat exchanger (11) in order to heat the gas of the second drying stage (6).

9. The facility as claimed in claim 7, further comprising an adjustable-speed fan (7), the aspiration of which is connected to the steam and gas output of the first dryer (2), and the backflow of which is connected to the condenser (8), the speed of the fan being commanded in order to maintain weak low pressure (of a few mbars) and controlled in the first dryer (2).

10. The facility as claimed in claim 7, wherein the transfer of the sludge between the exit from the first dryer (2) and the forming device (5) at the entry of the second dryer (6) is controlled by a speed-regulated coreless screw (4) which is configured to assure the gas tightness at the exit from the first dryer (2).

11. The facility as claimed in claim 8, wherein the low-temperature loop (B1) for circulation of liquid comprises:
  a part (B1.1) with a low temperature of between 30° C. and 80° C., and preferably between 60° C. and 70° C., upstream of the condenser (8);
  a part (B1.2) with a medium temperature of between 40° C. and 90° C., and preferably between 70° C. and 80° C., at the exit from the condenser (8);
  an exchanger (9) of heat between the liquid in the loop (B1) and a free source of energy, downstream or upstream of the condenser (8), for reheating of the liquid in the loop (B1) by a free or low-cost low-temperature source of energy, in particular the motor of a co-generation unit, a heat pump, a wood or biogas boiler, thermal solar systems, or another source of dead energy;
  at the exit from the exchanger (9) of heat between the liquid in the loop (B1) and the free source of energy, an exchanger (10) with a thermal fluid branch (3) which is configured to finish reheating the liquid in the loop (B1) at a regulated temperature, for the second dryer (6), which is between 40° C. and 90° C., and preferably between 80° C. and 90° C.;
  an exchanger (11) for heat between liquid and gas, and in particular water and air, which is configured to enable the liquid in the loop (B1) to heat the gas of the second dryer (6), which is put into motion in particular by a circulation fan (12);
  a pump (P2) for the circulation of the water in the loop (B1).

12. The facility as claimed in claim 7, further comprising a regulator having a first regulation loop configured to enable direct regulation of the intermediate dryness Si at the exit from the first dryer (2), with a means for calculation and command, and in particular an automaton (M) which establishes an intermediate dryness set point Sic on the basis of operating parameters.

13. The facility as claimed in claim 12, characterized in that the regulator is designed to determine an intermediate dryness set point Sic (%) according to the formula:

$$Sic = (\beta + \alpha * 556) / [(\beta - 89*\alpha)/Sf + 645*\alpha/Se + Q_0)]$$

wherein:
Se is the entry dryness measured (%)
Sf is the final predetermined dryness (%)
$\beta$ is a specific coefficient of the second drying stage (6), in kWh/TEE
$\alpha$ is a specific coefficient of the condenser (8)
and $Q_0$ is free heat which may be added in kWh/TMS.

14. The facility as claimed in claim 12, wherein the automaton (M) controls a valve (21) to control the flow rate, pressure or temperature of the thermal fluid (3) according to the intermediate dryness measured, this control being carried out by means of regulation of the pressure of the thermal fluid in the case of a steam thermal fluid, or by regulation of the flow rate or temperature (by mixing with a cold return of the thermal fluid) in the case of a thermal fluid of an organic fluid type.

15. The facility as claimed in claim 7, further comprising a regulator having a regulation loop which controls the quantity of the heat (Q3) supplied in the exchanger (10) between the thermal fluid and the liquid in the low-temperature loop (B1).

16. The facility as claimed in claim 7, further comprising a regulator having
  a first regulation loop configured to enable direct regulation of the intermediate dryness Si at the exit from the first dryer (2), with a means for calculation and command, and in particular an automaton (M) which establishes an intermediate dryness set point Sic on the basis of operating parameters; and
  a second regulation loop which controls the quantity of the heat (Q3) supplied in the exchanger (10) between the thermal fluid and the liquid in the low-temperature loop (B1),
  wherein the regulator is configured to regulate the facility solely on the basis of the second regulation loop, by shunting the first regulation loop.

17. The facility as claimed in claim 15, wherein the exchanger of heat (10) between the thermal fluid and the liquid in the low-temperature loop (B1) has as a control set point the temperature of the liquid in the loop (B1) at the exit from the exchanger (10), this temperature permitting the efficient operation of the exchanger (11) between the thermal fluid and the gas of the second dryer (6), and making it possible to ensure that the energy requirement of the second dryer (6) is balanced.

18. The facility as claimed in claim 12, further comprising a second regulation loop according to which the heat (Q3) supplied to the exchanger (10) is measured by means of measurement of the temperature and flow rate at the entry and exit of the exchanger (10), and, if the heat (Q3) is greater than a specific set point which is close to zero but is not nil, in order always to have a regulation range, the regulator modifies the exit signal of the first regulation loop, such that the heat supplied to the first dryer (2) is adapted.

19. The facility as claimed in claim 18, wherein, in order to be in optimum conditions for the exchanger (11) and the condenser (8), the regulator comprises a third regulation loop which uses as a set point the temperature of the water loop at the exit from the exchanger (11).

20. The facility as claimed in claim 19, wherein the third regulation loop is designed to use a set point temperature which is defined relative to a set point which depends on the flow rate of sludge measured at the sludge supply pump (1), and when the temperature at the exit from the exchanger (11) between the liquid in the low-temperature loop (B1) and the gas of the second dryer (6) increases, the flow rate of the circulation pump (P2) of the loop (B1) decreases to a range which is acceptable for the components.

* * * * *